United States Patent [19] [11] Patent Number: 5,014,740
Cameron [45] Date of Patent: May 14, 1991

[54] DISTRIBUTOR FOR PACKED TOWER

[76] Inventor: Gordon M. Cameron, 4 Wellesbourne Crescent, Willowdale, Ontario, Canada, M2H 1Y7

[21] Appl. No.: 525,570

[22] Filed: May 21, 1990

[51] Int. Cl.[5] .......................... B05B 15/06; B05B 1/20
[52] U.S. Cl. ................................. 137/561 A; 261/98
[58] Field of Search ................. 137/561 A, 561 R; 261/97, 98

[56] References Cited

U.S. PATENT DOCUMENTS

| 2,059,255 | 11/1936 | Lassiat | 137/561 A |
| 2,532,918 | 12/1950 | Hungerford, Jr. | 137/561 A |
| 3,392,966 | 7/1968 | Eckert | 261/97 |
| 3,419,251 | 12/1968 | Eckert | 261/98 X |
| 3,819,813 | 6/1974 | Jones, Jr. et al. | 261/98 X |
| 4,185,075 | 1/1980 | Ellis et al. | 261/98 X |
| 4,267,978 | 5/1981 | Manteufel | 137/561 A X |
| 4,272,026 | 6/1981 | Jazlowski et al. | 261/98 X |
| 4,561,461 | 12/1985 | Hubert et al. | 137/561 A |
| 4,565,216 | 1/1986 | Meier | 137/561 A |
| 4,569,364 | 2/1986 | Keller et al. | 137/561 A X |
| 4,580,597 | 4/1986 | Cordingley et al. | 137/561 A |
| 4,609,010 | 9/1986 | Watson | 137/561 A X |
| 4,782,857 | 11/1988 | Bieri | 137/561 A |

Primary Examiner—John Rivell
Attorney, Agent, or Firm—Rogers, Bereskin & Parr

[57] ABSTRACT

A distributor for distributing sulphuric acid on a packed tower. The distributor has an array of horizontal parallel distributing pipes in a single horizontal plane spanning a tower containing a packing and located above the packing. The pipes extend through the tower shell at one end and are accessible through a clean-out port at the other end. Feed enters the pipes at one end and the clean-out port at the other end permits cleaning without entering the tower. There are holes in the pipes arranged in a number of rows each angled downwardly. Each hole has a simple corrosion resistant insert to protect against hole erosion.

9 Claims, 5 Drawing Sheets

DISTRIBUTOR FOR PACKED TOWER

FIELD OF THE INVENTION

This invention relates to apparatus for distributing a liquid across a packed tower. The liquid will normally be sulphuric acid or oleum. For convenience, both will be referred to in the description and in the claims as "sulphuric acid".

BACKGROUND OF THE INVENTION

Sulphuric acid plants, and other applications involving the drying of chlorine or sulphur dioxide, commonly include packed towers in which concentrated sulphuric acid is circulated over a body of packing. Such towers have been used for more than one hundred years, and many different approaches to the construction of such towers have been attempted, with varying degrees of success.

The basic criteria that a good distribution system must meet are (1) the need to spread the liquid uniformly over the packing with a minimum reliance on the packing as a liquid spreading medium, (2) the need to maintain good distribution regardless of acid flow, (3) the ability of the device to demonstrate good distribution without complex tests, (4) the ability of the device to be cleaned of any accumulations of sulphate, brick chips, packing chips or other rubbish without a major maintenance effort, and (5) resistance to corrosion and erosion such that good distribution is present not only when the device is new but also when it has eroded sufficiently to be near the end of its life span. The device should also be simple, easy to repair or replace, durable, and made of reasonably available economical materials.

An early method used to distribute acid was a cast iron pipe distributor. This device used a central header which fed arms which in turn had drilled holes which allowed the acid to flow out on to the packing. The header and arms were made from common cast iron fittings such as tees, crosses and pipe. Acid velocities from the holes were in the range of three to six feet per second. While the device was relatively economical compared with other alternatives, it blocked access to the packing since the pipes and header covered approximately 50 per cent of the tower cross-section. The arrangement also required significant mechanical support.

Other defects in the cast iron system included the lack of erosion resistance in the cast iron which resulted in holes sizes increasing to the point of affecting acid distribution. There was also some tendency for the collection of tramp ceramic, brick and sulphate material in the arms where it could not be seen and from which it was difficult to remove.

The cast iron system was later modified by the insertion of corrosion resistant materials in the holes as discrete inserts. Subsequently cast iron was displaced completely by the use of very corrosion resistant materials such as high silicone containing austenitic steels. These materials needed no inserts since they are very corrosion and erosion resistant in strong sulphuric acid. However these designs are still difficult to clean, and they block a fraction of the tower cross-section which can typically be as high as 45 per cent.

A relatively common approach in North American practice has been to use troughs from which the acid overflows through downcomer spouts onto the packing. Since the spouts are open at the top, it is relatively easy to see any build-up of tramp materials and to remove such materials. However the acid distribution is then severely dependant on the leveling of the individual troughs, the absence of any sagging, and the absence of any entrance effects. Acid distribution is also needed outside the tower to ensure that each individual header receives an appropriate share of the total acid flow. The troughs are usually not corrosion resistant and replacement is necessary from time to time. Moreover the troughs are normally specially designed for each tower so that repair or replacement is very difficult. The design can be improved, but at significant cost, by using more corrosion resistant materials. A newer version is also available in which the acid flows outwardly through submerged holes, thus reducing the sensitivity of the device to levelling.

SUMMARY OF THE INVENTION

It is an object of this invention to provide apparatus for distributing a liquid containing sulphuric acid across a packed tower, said tower having an external shell, said apparatus comprising a plurality of pipe means located in a substantially horizontal plane and each extending across said tower, each pipe means having first and second ends, each pipe means extending through said shell at said first end and extending at least to a position adjacent to said shall at said second end, said shell having a port therein adjacent said second end of each said pipe means, each pipe means further having multiple rows of holes therein, said holes of one row being oriented at a different angle to the vertical than the holes of another row, and a body of packing in said tower, said pipe means being spaced above said packing for said holes to distribute acid onto said packing, each pipe means having closure means removably coupled to said second end thereof for closing the interior of said pipe means from the environment external to said pipe, said closure means being located to be accessible at said ports, so that said closure means can be removed from outside said tower for removal of deposits accumulated in said pipe means during operation.

Further objects and advantages will appear from the following description, taken together with the accompanying drawings.

DETAILED DESCRIPTION OF PREFERRED EMBODIMENTS

Figure 1:
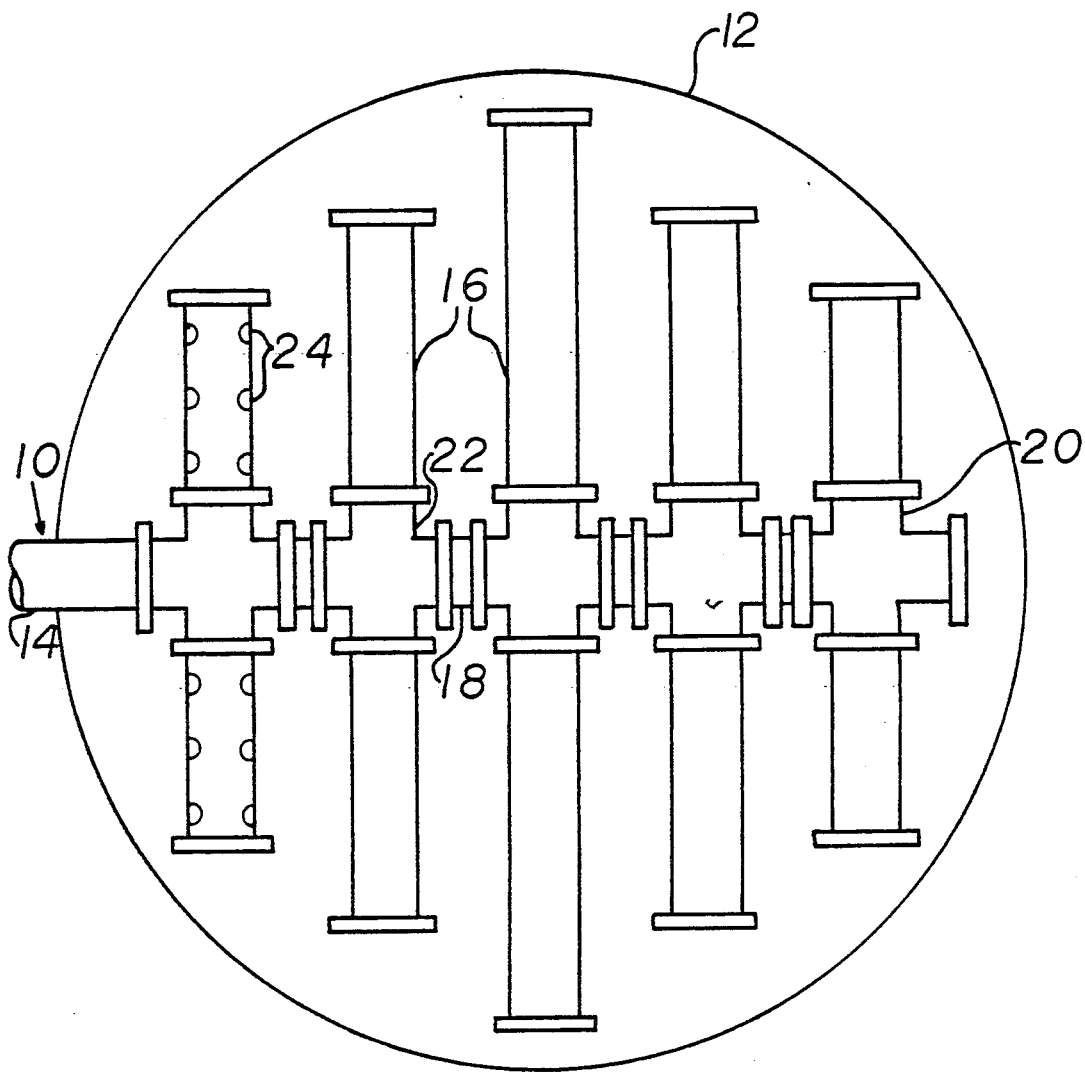
FIG. 1 shows a prior art distributor of the pipe type.

Reference is first made to FIG. 1, which shows a pipe distributor 10 according to the prior art. As shown, an acid feed stream enters the tower 12 through an inlet pipe 14 which carries the acid to side arms 16. Where cast iron is used, a central header 18 is assembled from standard tee and cross fittings 20, 22, and assembled with side arms 16 by bolting the flanges of the pipe and fittings together. The side arms 16 project horizontally at right angles to the header 18 and are provided with drilled holes on each side to allow the acid to flow out over the packing. Such holes are indicated at 24 on one of the arms in FIG. 1.

With the design shown in FIG. 1, there are only two rows of holes per arm and, with the limited flow per arm, the diameter of the arms is small, rarely exceeding 8 inches in diameter. This size requires support both at the centre and edge of the tower. A further inherent characteristic of the FIG. 1 arrangement using cast iron is that the space between the arms is set by the fittings used, and typically the arms block nearly 50 per cent of the tower cross-section. Variations of the FIG. 1 design using corrosion resistant steels and other alloys allow more flexibility in terms of arm spacing than with cast iron, but the use of fewer arms to block less of the tower cross-section results in a poorer acid distribution and hence a need for more tower packing.

It is also noted that when liquid enters packing in a tower, the liquid spreads laterally from the feed point until uniform distribution is obtained. The spreading is relatively slow with an angle of spreading of about 15° from the vertical. The effectiveness of the tower packing is therefore dependant on the distance between the feed points or the number of feed points per unit area. The need for good distribution of liquid increases the extent to which the FIG. 1 system blocks the tower cross-section. Blocking a large portion of the tower section has various disadvantages, but in particular, if the distributor is buried in the packing (which was commonly the case), it reduces the area through which gas may rise through the tower.

Another problem with the FIG. 1 system is that cleaning of distributors is difficult, regardless of whether trough or pipe type units are used. In both cases it is necessary to enter the tower, which is a hazardous area because of the acid present. In the case of pipe type units it is also necessary to undo internal flanges to gain access to tramp materials in the distributor. An important reason for this difficulty is that present distributors are completely contained inside the tower.

Figure 2:
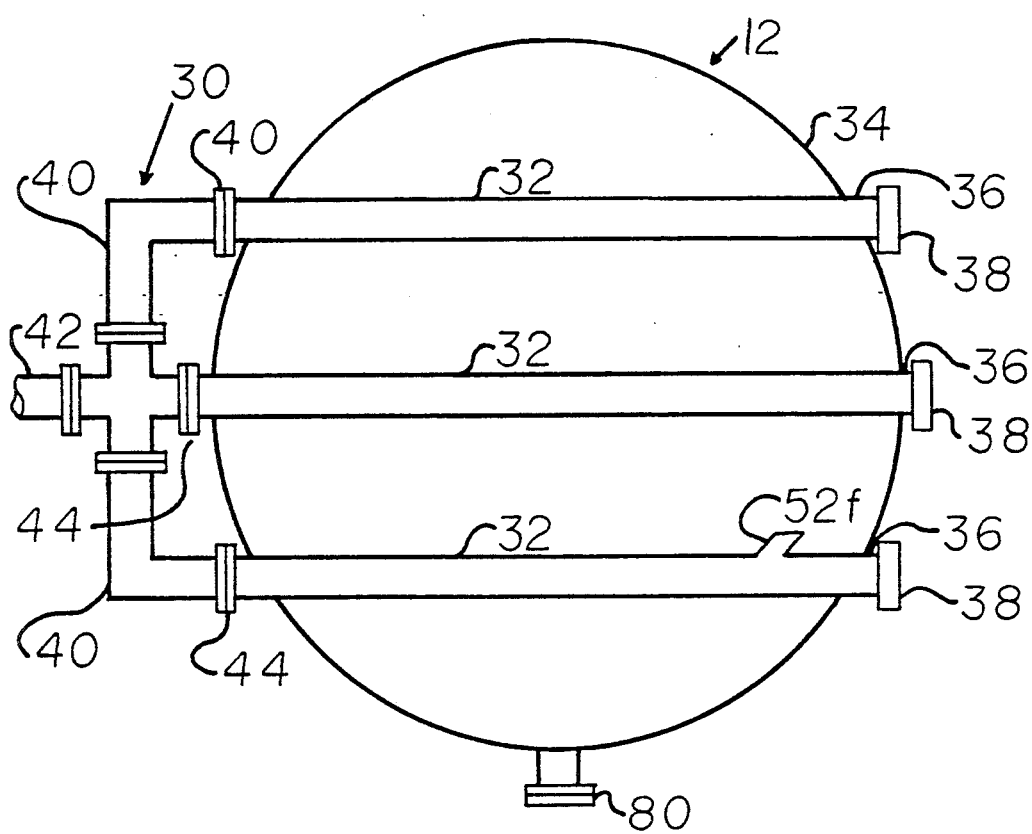
FIG. 2 is a plan view of a distributor system according to the present invention.

Reference is next made to FIG. 2, which shows a distributor 30 according to the invention for a tower of size similar to that of FIG. 1 (which can be up to 30 feet in diameter). In the FIG. 2 arrangement each header 32 is fed from outside the tower 12. Each header feeds a number of rows of feed points. There can for example be two, three, four, or five or more rows of feed points for each header 12 as will be described. The individual headers 32 can project through the wall 34 of the tower at their ends remote from the feed, as indicated at 36 and as will be described in more detail. At the ends 36 clean-out devices or ports 38 can be provided. The ports 38 are useful for systems which collect either debris or corrosion products.

As shown in FIG. 2, the headers 32 also each project through the tower at their feed ends and are connected outside the tower to feed pipes 40 which are located at the ends of the headers remote from the free ends 36. Feed pipes 40 are connected to a main feed pipe 42. For removal of the headers 32, as will be described, the feed pipes 40 are unbolted at flanges 44 from the header 32.

It is evident from FIG. 2 that the fraction of the tower cross-section which is blocked by the distributor 30 is much less than that of the classic design shown in FIG. 1, and the distributor 30 itself is much simpler.

Figure 3:
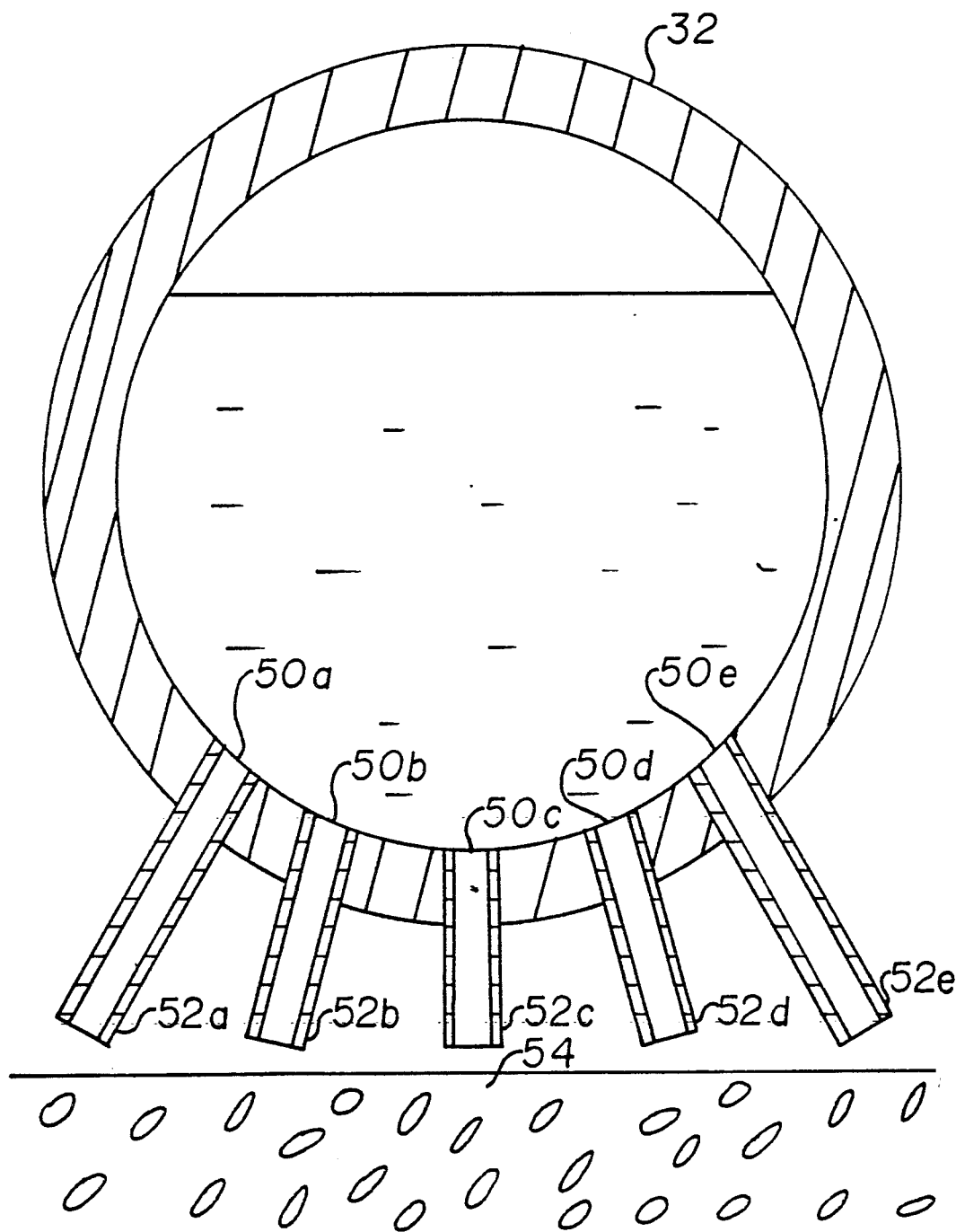
FIG. 3 is a cross-sectional view of a tubular header or pipe according to the present invention.

FIG. 3 shows an individual header 32 which contains holes 50a to 50e for five rows of feed points. Tubular inserts, 52a to 52e are placed one in each hole and project outwardly from the header to protect the holes against corrosion. The inserts can be made of heat exchanger tubing, or they can be made by casting a highly corrosion resistant alloy. The inserts 52a to 52e can be inserted by chilling them, inserting them and then allowing them to warm, or they can be rolled with a tube roll. Where tubes are used, longer sections of tube can be used to lead acid to different parts of the tower. Alternatively the inserts 52a to 52e can project sufficiently to allow other conduits such as hose or tube to be connected to them. In the exemplary arrangement shown in FIG. 3, the upper inserts 52a, 52e are longer than the next lower inserts 52b, 52d, which in turn are longer than the bottom insert 52c. This allows good distribution of the acid over the packing, which is shown at 54 as being located below the header 32 and below inserts 52a to 52e. Thus, there is reduced reliance on the packing itself to promote spreading of the liquid.

If desired, and as shown at 52f in FIG. 2, some of the inserts can be curved to ensure liquid is spread to all parts of the packing 54. The inserts 52a to 52f can be of the corrosion resistant metal known as Saramet (trade mark) or of other appropriate corrosion resistant material.

Figure 4:
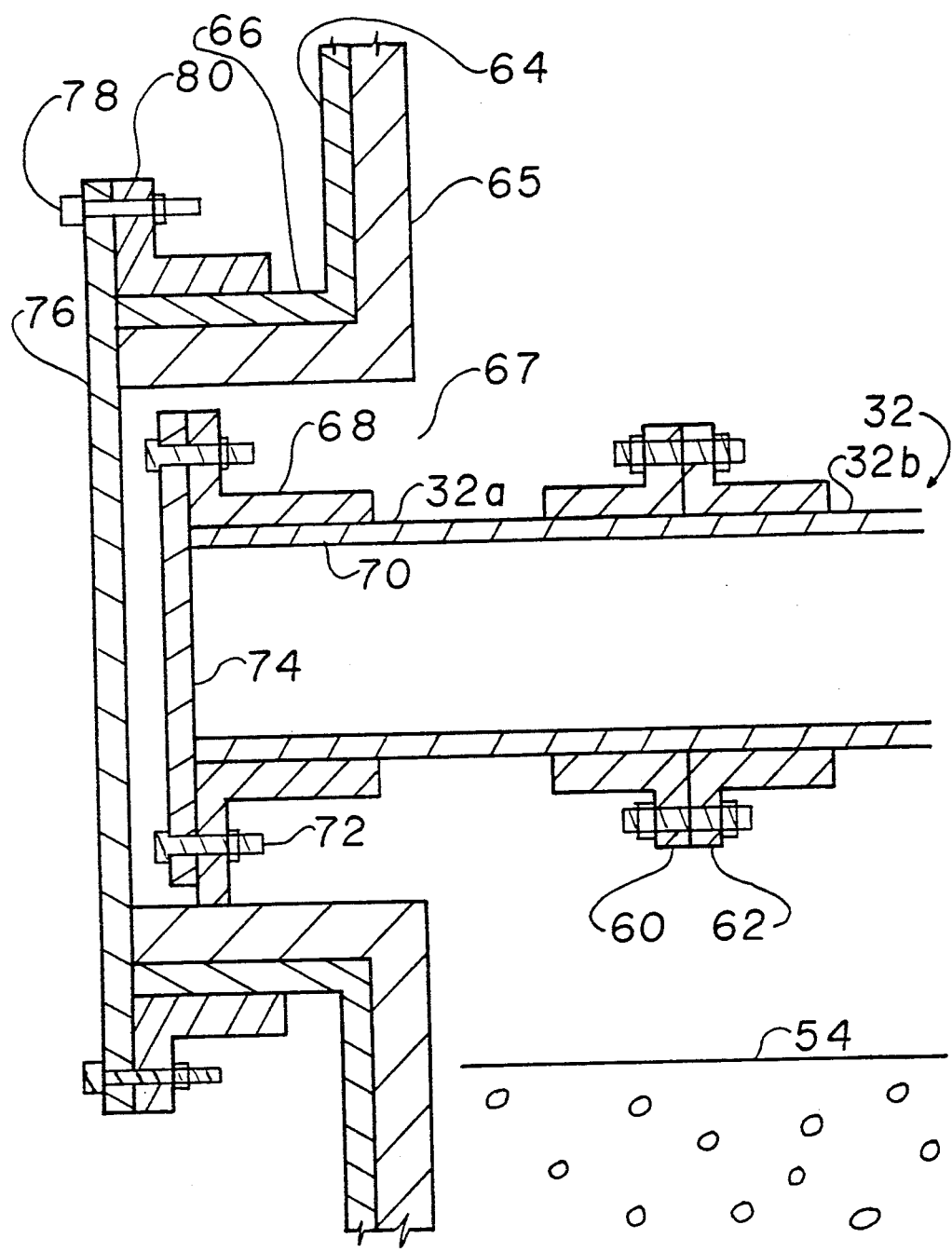
FIG. 4 is a partial cross-sectional view showing the wall of a tower containing a distributor according to the present invention and also showing detail of a clean-out arrangement.

Reference is next made to FIG. 4, which shows diagrammatically a typical arrangement for a clean-out port 38. In this arrangement the header pipe 32 is shown as being formed in two sections 32a, 32b joined by flanges 60, 62 threaded thereon and bolted together (since such pipe is typically not available in lengths greater than 18 feet, and a 30 foot diameter tower is assumed). The shell or steel wall of the tower is shown at 64, lined with brick 65. The shell is flanged at 66 to form a port 67 in the wall 64.

A large external flange 68 is fitted to the header section 32a by threads 70. The flange 68 is also connected by bolts 72 to a cover plate 74. The cover plate 74 acts as an access port which can be removed by removal of bolts 72. This allows access to the interior of header 32 for visual inspection from outside the tower, and also for removal of the header as will be explained. The cover plate 74 is slightly smaller in diameter than that of flange 68, so that while flange 68 supports the weight at one end of header 32 on the brick 65, the cover plate 74 can be removed for access to the interior of the header.

Access to cover plate 74 is obtained by removing a second cover plate 76 secured by bolts 78 to an exterior flange 80. Flange 80 is connected in any desired manner, e.g. threads, to flange 66.

It will be seen that the interior diameter of the port 67 is greater than the exterior diameter of flanges 60, 62, 68. This allows complete removal of the header 32 when required (e.g. for replacement). Such removal can be effected (for example) by inserting a guide such as a smaller pipe or channel into the header 32 and then removing header 32 on such support (after of course removing the cover plates 74, 76).

For cleaning without removal of the header 32 from the tower, the cover plates 74, 76 can be taken off, and then a vacuum hose can be inserted to suck up debris. This can be done without entering the tower, thereby increasing operational safety.

Figure 5:
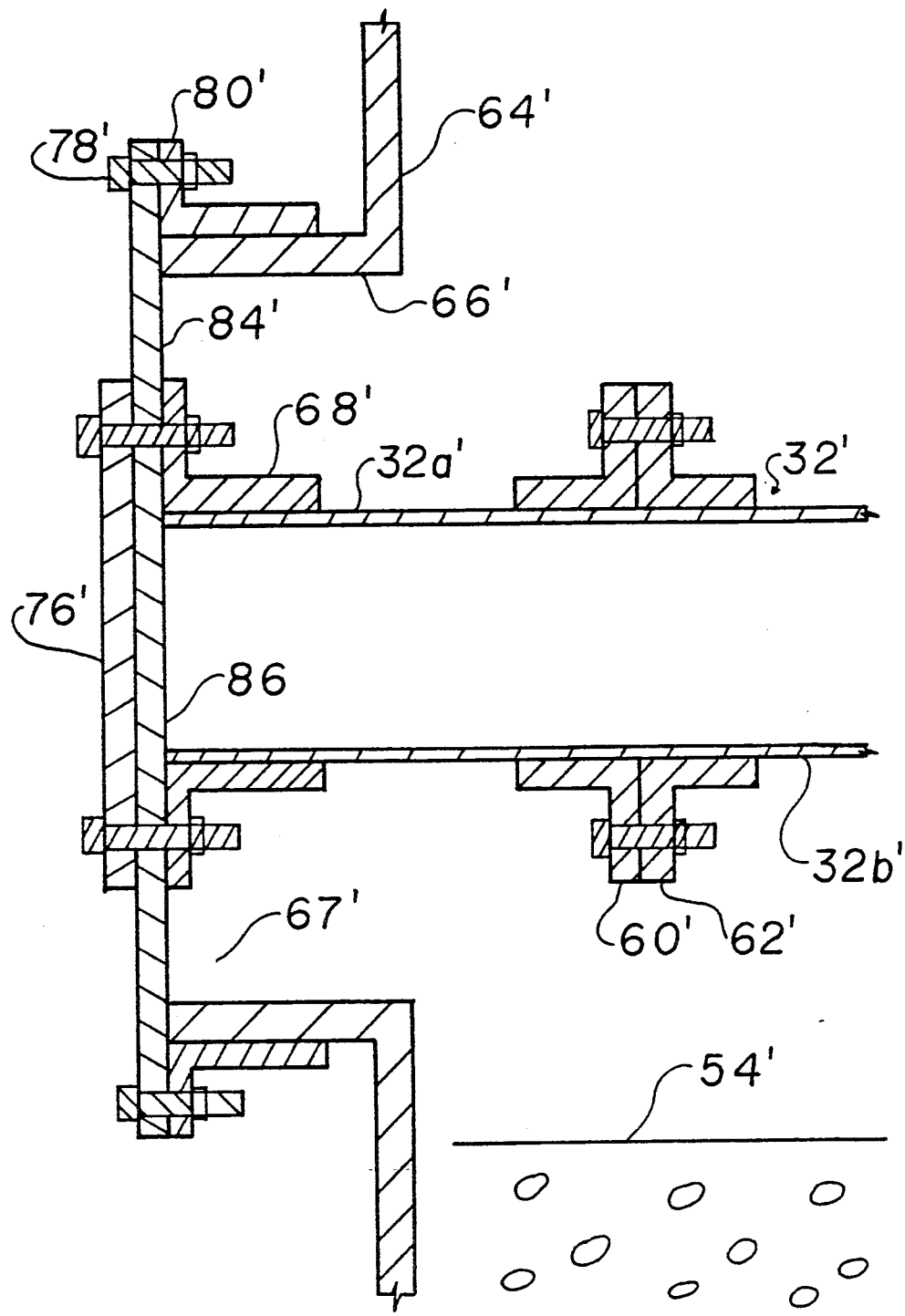
FIG. 5 is a view similar to that of FIG. 4 but showing a modification thereof.

FIG. 5 shows a modified arrangement in which primed reference numerals indicate parts corresponding to those of FIG. 4. In the FIG. 5 arrangement the brick lining for the tower is not present, and the flange 68' is bolted to an annular plate 84' which in turn is bolted to the flange 80'. The plate 84. contains a central opening 86 which allows access to the interior of the header 32'. Opening 86 will normally be of the same internal diameter as that of the header 32'. A cover plate 76' normally covers the opening 86 and can be bolted to plate 84' using the same bolts 90 which secure plate 84' to flange 68'; alternatively different bolts can be used if desired.

It will be seen from FIGS. 3 and 4 that the headers 32 are now located above the packing 54 onto which they distribute liquid. In current practice, designers have preferred not to place the headers above the packing since they were uncertain where the liquid would land on the packing. Therefore the current practice is to bury the headers wholly or partly in the packing. This has the disadvantage that the exterior of the pipe cannot be inspected or cleaned easily, nor can the distribution be checked. With the present arrangement, inspection ports can be placed in the tower at appropriate locations (e.g. as shown at 80 in FIG. 2, on the same level as the headers 32) to view directly the distribution from the headers. (It will be appreciated that although not shown, there may also be further packing and further headers in the tower above those shown.)

It is also important to note that since the header pipes 32 are not located in the packing, their cross-section is far less critical than if they were in the packing. When the distributor is buried in the packing, then at the distributor level the tower effectively has a smaller cross section for gas and liquid flow. This may restrict throughput and may require a larger size tower. When the pipes are outside the packing, even a relatively large cross-section will have little effect on gas flow through the tower. In addition, since the headers 32 are spaced well apart (for example 48 inches instead of the usual 12 inches), it is possible if necessary for a maintenance person to walk between the headers on top of the packing, to clean debris from the top of the packing.

In the use of the invention, it is preferred to employ larger diameter header pipes since this provides a much larger corrosion allowance and much lower bending stresses than smaller size header pipe. This provides both economic an safety advantages. There are several reasons for this, including the following.

1. Larger pipe has thicker walls than smaller pipe.

2. Even quality cast iron corrodes. A corrosion rate of 0.020 inches per year is quite common.

3. Cast iron pipe requires flanging for assembly. This requires trimming the pipe to round and then cutting a thread on the pipe. With thicker pipe, more wall thickness remains after cutting the thread.

4. Larger pipe can carry more acid and feed more points.

5. High quality cast iron pipe is both stronger and more corrosion resistant to sulphuric acid. The strength can range from 2,000 to 3,000 psi up to 10,000 psi depending on the quality of the cast iron.

The following tables display the inner diameter ID (inches), the moment of inertia $M_I$, the running load per inch W (pounds), the bending moment $B_M$, and the stress (psi) for various diameter pipes at various remaining wall thicknesses ("WALL") in inches, assuming a 30 foot span. It is assumed that the design safety factor is 2 to 1, that the density of the cast iron is 0.3 lbs. per cubic inch, and that the acid density is 0.0642 lbs per cubic inch.

TABLE 1

| WALL | (6 inch O.D. pipe, D under flange = 6.225 inches) | | | | |
| --- | --- | --- | --- | --- | --- |
| | .090 | .100 | .110 | .120 | .130 |
| I.D. | 6.045 | 6.025 | 6.005 | 5.985 | 5.9650 |
| $M_I$ | 8.1628 | 9.0260 | 9.8806 | 10.7267 | 11.5644 |
| W | 3.5740 | 3.6187 | 3.6633 | 3.7077 | 3.7520 |
| $B_M$ | 14475 | 14655.7 | 14836 | 15016 | 15195 |
| STRESS | 5519 | 5054 | 4674 | 4357 | 4090 |

TABLE 2

| WALL | (8 inch O.D. pipe, D under flange = 8.025 inches) | | | | | |
| --- | --- | --- | --- | --- | --- | --- |
| | .090 | .100 | .110 | .120 | .130 | .140 |
| I.D. | 8.025 | 8.005 | 7.985 | 7.965 | 7.945 | 7.925 |
| $M_I$ | 18.89 | 20.912 | 22.918 | 24.910 | 26.887 | 28.849 |
| W | 5.6011 | 5.6605 | 5.7197 | 5.779 | 5.8377 | 5.8965 |
| $B_M$ | 22684 | 22925 | 23165 | 23405 | 23643 | 23881 |
| STRESS | 4926 | 4497 | 4147 | 3855 | 3609 | 3396 |

TABLE 3

| WALL | (10 inch O.D. pipe. D under flange = 10.29 inches) | | | |
| --- | --- | --- | --- | --- |
| | .090 | .100 | .110 | .120 |
| I.D. | 10.11 | 10.09 | 10.07 | 10.05 |
| $M_I$ | 37.509 | 41.555 | 45.577 | 49.575 |
| W | 8.2994 | 8.3742 | 8.4489 | 8.5234 |
| $B_M$ | 33613 | 33916 | 34218 | 34520 |
| STRESS | 4611 | 4199 | 3863 | 3583 |

TABLE 4

| WALL | (12 inch O.D. pipe, D under flange = 12.25 inches) | | | |
| --- | --- | --- | --- | --- |
| | .090 | .100 | .110 | .120 |
| I.D. | 12.07 | 12.05 | 12.03 | 12.01 |
| $M_I$ | 63.552 | 70.440 | 77.294 | 84.114 |
| W | 11.323 | 11.4118 | 11.5010 | 11.590 |
| $B_M$ | 45858 | 46218 | 46579 | 46940 |
| STRESS | 4420 | 4019 | 3691 | 3418 |

TABLE 5

| WALL | (14 inch O.D. pipe, D under flange = 13.46 inches) | | | |
| --- | --- | --- | --- | --- |
| | .090 | .100 | .110 | .120 |
| I.D. | 13.28 | 13.26 | 13.24 | 13.22 |
| $M_I$ | 84.473 | 93.649 | 102.784 | 111.878 |
| W | 13.5204 | 13.6187 | 13.7168 | 13.8148 |
| $B_M$ | 54758 | 55156 | 55553 | 559590 |
| STRESS | 4363 | 3964 | 3638 | 3366 |

TABLE 6

| (16 inch O.D. pipe, D under flange = 15.42 inches) | | | | |
|---|---|---|---|---|
| WALL | .090 | .100 | .110 | .120 |
| I.D. | 15.24 | 15.22 | 15.20 | 15.18 |
| M/ | 127.33 | 141.21 | 155.02 | 168.79 |
| W | 17.305 | 17.418 | 17.531 | 17.643 |
| B.M | 70086 | 70544 | 71001 | 71455 |
| STRESS | 4244 | 3852 | 3531 | 3264 |

TABLE 7

| (18 inch O.D. pipe, D under flange = 17.40 inches) | | |
|---|---|---|
| WALL | .09 | .10 |
| I.D. | 17.22 | 17.20 |
| M/ | 183.32 | 203.34 |
| W | 21.4246 | 21.552 |
| B.M | 86770 | 87286 |
| STRESS | 4071 | 3735 |

Table 8 below is derived from the above tables and shows the life expectancy of a header pipe versus its size, assuming corrosion of 0.020 inches per year in the internal diameter of the header pipe. It will be seen that with the parameters shown, a 6 inch header pipe can be expected to last slightly over 9 years, while an 18 inch header pipe can be expected to last about 26 years. While these rates will vary depending on the rate of corrosion, it will be seen that there is a major advantage in using larger pipe.

TABLE 8

| (Pipe life vs. Size, for 4,000 psi stress) | | | | | | | |
|---|---|---|---|---|---|---|---|
| Pipe Dia. (inches) | 6 | 8 | 10 | 12 | 14 | 16 | 18 |
| Wall thickness | .134 | .115 | .106 | .100 | .099 | .096 | .092 |
| Original I.D | 5.957 | 7.975 | 10.078 | 12.050 | 13.262 | 15.228 | 17.216 |
| Ending I.D. | 5.585 | 7.505 | 9.550 | 11.450 | 12.380 | 14.300 | 16.160 |
| Corrosion Allowance (dia.) | .3720 | .470 | .528 | .6 | .882 | .928 | 1.056 |
| Corrosion Allowance (radius) | .1860 | .235 | .264 | .3 | .441 | .464 | .528 |
| Life in years (at .02 inches per year) | 9.3 | 11.75 | 13.20 | 15 | 22 | 23.2 | 26.4 |

I claim:

1. Apparatus for distributing a liquid containing sulphuric acid across a packed tower, said tower having an external shell, said apparatus comprising a plurality of pipe means located in a substantially horizontal plane and each extending across said tower, each pipe means having first and second ends, each pipe means extending through said shell at said first end and extending at least to a position adjacent to said shell at said second end, said shell having a port therein adjacent said second end of each said pipe means, each pipe means further having multiple rows of holes therein, said holes of one row being oriented at a different angle to the vertical than the holes of another row, and a body of packing in said tower, said pipe means being spaced above said packing for said holes to distribute acid onto said packing, each pipe means having closure means removably coupled to said second end thereof for closing the interior of said pipe means from the environment external to said pipe, said closure means being located to be accessible at said ports, so that said closure means can be removed from outside said tower for removal of deposits accumulated in said pipe means during operation.

2. Apparatus according to claim 1 wherein said pipe means are formed from cast iron, and further including corrosion resistant inserts located in said holes.

3. Apparatus according to claim 2 wherein said inserts in at least one of said rows of holes are of a length different from said inserts in another of said row of holes.

4. Apparatus according to claim 2 wherein said inserts extend to a position closely adjacent said packing to permit liquid to flow from said pipe means onto said packing with reduced splashing.

5. Apparatus according to claim 1 wherein each said port is larger in diameter than the largest diameter of its associated pipe means, so that said pipe means can be removed from said tower through said ports.

6. Apparatus according to claim 1 and including header means located outside said tower and connected to each of said pipe means for feeding said liquid to said first ends of said pipe means.

7. Apparatus according to claim 1 wherein each pipe includes an end flange connected to said second end thereof, said closure means being a cover plate covering said second end of said pipe, said cover plate being accessible through its associated port.

8. Apparatus according to claim 7 and including feed means removably coupled to the first end of each pipe means for feeding said liquid to said pipe means, and connection means for securing said feed means to said first end of said pipe means, said connection means being removable from outside said tower.

9. Apparatus according to claim 1 and including a first cover plate removably connected to said shell and covering said port, means removably connecting said second end of said pipe to said first cover plate, and said first cover plate having an opening therein aligned with and opening into the interior of said pipe, said closure means comprising a second cover plate removably connected to said first cover plate and normally closing said opening.

* * * * *